(12) United States Patent
Oing et al.

(10) Patent No.: US 8,662,842 B2
(45) Date of Patent: Mar. 4, 2014

(54) METHOD AND SYSTEM FOR UTILIZING ROTORSPEED ACCELERATION TO DETECT ASYMMETRIC ICING

(75) Inventors: Hubert Oing, Berlin (DE); Bastian Sundermann, Berlin (DE); Christian Siuts, Berlin (DE)

(73) Assignee: General Electric Company, Schenectady, NY (US)

( * ) Notice: Subject to any disclaimer, the term of this patent is extended or adjusted under 35 U.S.C. 154(b) by 739 days.

(21) Appl. No.: 12/824,516

(22) Filed: Jun. 28, 2010

(65) Prior Publication Data

US 2011/0318165 A1    Dec. 29, 2011

(51) Int. Cl.
*F03D 7/04*    (2006.01)
(52) U.S. Cl.
USPC .................................. 416/1; 416/35; 416/65
(58) Field of Classification Search
USPC ............................. 415/1, 118; 416/1, 35, 61
See application file for complete search history.

(56) References Cited

U.S. PATENT DOCUMENTS 7,708,524 B2 * 5/2010 Sundermann et al. .......... 416/39

FOREIGN PATENT DOCUMENTS

| EP | 1936186 | A2 * | 6/2008 | .............. F03D 7/04 |
| GB | 2448940 | A * | 11/2008 | .............. B64C 7/04 |

* cited by examiner

*Primary Examiner* — Nathaniel Wiehe
*Assistant Examiner* — Woody A Lee, Jr.
(74) *Attorney, Agent, or Firm* — Ernest G. Cusick; Frank A. Landgraff (57) ABSTRACT

A method and system for detecting asymmetric utilizing longitudinal tower acceleration data may include: providing a rotorspeed acceleration monitoring system; determining from the rotorspeed acceleration monitoring system whether a rotorspeed acceleration is above a rotorspeed acceleration limit; determining whether a rotor-mass imbalance condition exists; and determining whether a longitudinal tower acceleration coincides with icing on a rotor.

10 Claims, 5 Drawing Sheets

METHOD AND SYSTEM FOR UTILIZING ROTORSPEED ACCELERATION TO DETECT ASYMMETRIC ICING

This application is related to commonly assigned U.S. Pat. No. 7,708,524, filed Dec. 21, 2006; and U.S. patent application Ser. No. 11/643,456, filed Dec. 21, 2006 and abandoned Oct. 22, 2007.

BACKGROUND OF THE INVENTION

The present invention relates to the accumulation of ice occurring on the rotor blades of a wind turbine; and more particularly to a method and system for detecting asymmetric icing.

Wind turbines are commonly installed in areas where the climatic conditions allow for ice accumulation (hereinafter "icing"). Icing on the rotor blades (hereinafter "blades") of a wind turbine may cause a reduction in power output and higher stresses on some wind turbine components. Icing may be divided into two forms, symmetric (icing on all blades) and asymmetric, (icing on some blades). Asymmetric icing increases the vibration on the wind turbine tower and increases the rotorspeed acceleration. Asymmetric icing may also cause a rotor-mass imbalance, which leads to higher fatigue loads; requiring more robust and expensive wind turbine components.

Current systems of detecting asymmetric icing typically require additional hardware including: sensors, anemometers, and piezoelectric transducers. Moreover, wind turbine operators generally need to purchase and install this additional hardware.

There are a few concerns with the current systems and methods for addressing asymmetric icing. The requirement of additional hardware increases the installation and operational costs of the wind turbine. These additional costs may prohibit wind turbine operation in some environments.

For the foregoing reasons, there is a need for a method and system for detecting asymmetric icing utilizing existing wind turbine hardware. The method should not require additional hardware.

BRIEF DESCRIPTION OF THE INVENTION

In accordance with an embodiment of the present invention, a method of detecting asymmetric icing on a wind turbine, the method comprising: providing a rotorspeed acceleration monitoring system; determining from the rotorspeed acceleration monitoring system whether a rotorspeed acceleration is above a rotorspeed acceleration limit; determining from the rotorspeed acceleration monitoring system whether the rotorspeed acceleration is oscillating at a frequency related to a rotorspeed; determining whether a rotor-mass imbalance condition exists; determining whether the rotor-mass imbalance coincides with icing on a rotor; and determining whether a longitudinal tower acceleration coincides with icing on the rotor.

In accordance with another embodiment of the present invention, a system for detecting asymmetric icing on a wind turbine, the system comprising: a rotorspeed acceleration monitoring system; means for determining whether a rotorspeed acceleration is above an acceleration limit from the rotorspeed acceleration monitoring system; means for determining whether the rotorspeed acceleration is oscillating at a frequency related to a rotorspeed; means for determining whether a rotor-mass imbalance condition exists; means for determining whether the rotor-mass imbalance coincides with icing on a rotor; and means for determining whether a longitudinal tower acceleration coincides with icing on the rotor.

In accordance with another embodiment of the present invention, a wind turbine comprising: a tower; a nacelle; an asymmetric icing detection system configured for performing the steps of: a) determining whether rotor acceleration data is available; and if rotor acceleration data is available, then performing the steps of: rotorspeed acceleration data; and determining whether a rotorspeed acceleration is above a rotorspeed acceleration limit; otherwise if rotor acceleration data is not available, then performing the steps of: receiving tower vibration data; and determining whether a longitudinal tower acceleration is above a longitudinal acceleration limit; b) determining whether a rotor-mass imbalance condition exists comprising the steps of: determining whether a longitudinal tower acceleration frequency is approximately a rotor frequency; and receiving a rotorspeed; or determining whether a maximum longitudinal tower acceleration repeatedly occurs near the rotor location where the immediately previous maximum longitudinal tower acceleration occurred; and receiving a rotor position; c) determining whether the longitudinal tower acceleration coincides with icing on a rotor, wherein the rotor includes a plurality of blades; d) receiving at least one ambient weather condition and means for determining whether at least one blade of the plurality of blades has a potential for icing; e) determining which blade of the plurality of blades is experiencing icing; and f) providing notification on which blade of the plurality of blades is experiencing icing.

In accordance with another embodiment of the present invention a method of detecting asymmetric icing on a wind turbine, the method comprising: providing a rotorspeed acceleration monitoring system; determining whether rotor acceleration data is available; and if rotor acceleration data is available, then further comprising: receiving rotorspeed acceleration data; and determining whether a rotorspeed acceleration is above a rotorspeed acceleration limit; otherwise if rotor acceleration data is not available, then further comprising: receiving tower vibration data; and determining whether a longitudinal tower acceleration is above a longitudinal acceleration limit; determining whether a rotor-mass imbalance condition exists comprising: determining whether a longitudinal tower acceleration frequency is approximately a rotor frequency; and receiving a rotorspeed; or determining whether a maximum longitudinal tower acceleration repeatedly occurs near the rotor location where the immediately previous maximum longitudinal tower acceleration occurred; and receiving a rotor position; determining whether the longitudinal tower acceleration coincides with icing on a rotor, wherein the rotor includes a plurality of blades; receiving at least one ambient weather condition and determining whether at least one blade of the plurality of blades has a potential for icing; determining which blade of the plurality of blades is experiencing icing; and providing notification on which blade of the plurality of blades is experiencing icing.

DETAILED DESCRIPTION OF THE INVENTION

The present invention has the technical effect of determining when asymmetric icing may be occurring on at least one blade of a wind turbine. As described below, embodiments of the present invention may be applied to a wide variety of wind turbine, each comprising at least two blades. After determining that asymmetric icing may be occurring, embodiments of the present invention may provide a notification of the icing condition.

The following detailed description of preferred embodiments refers to the accompanying drawings, which illustrate specific embodiments of the invention. Other embodiments having different structures and operations do not depart from the scope of the present invention.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
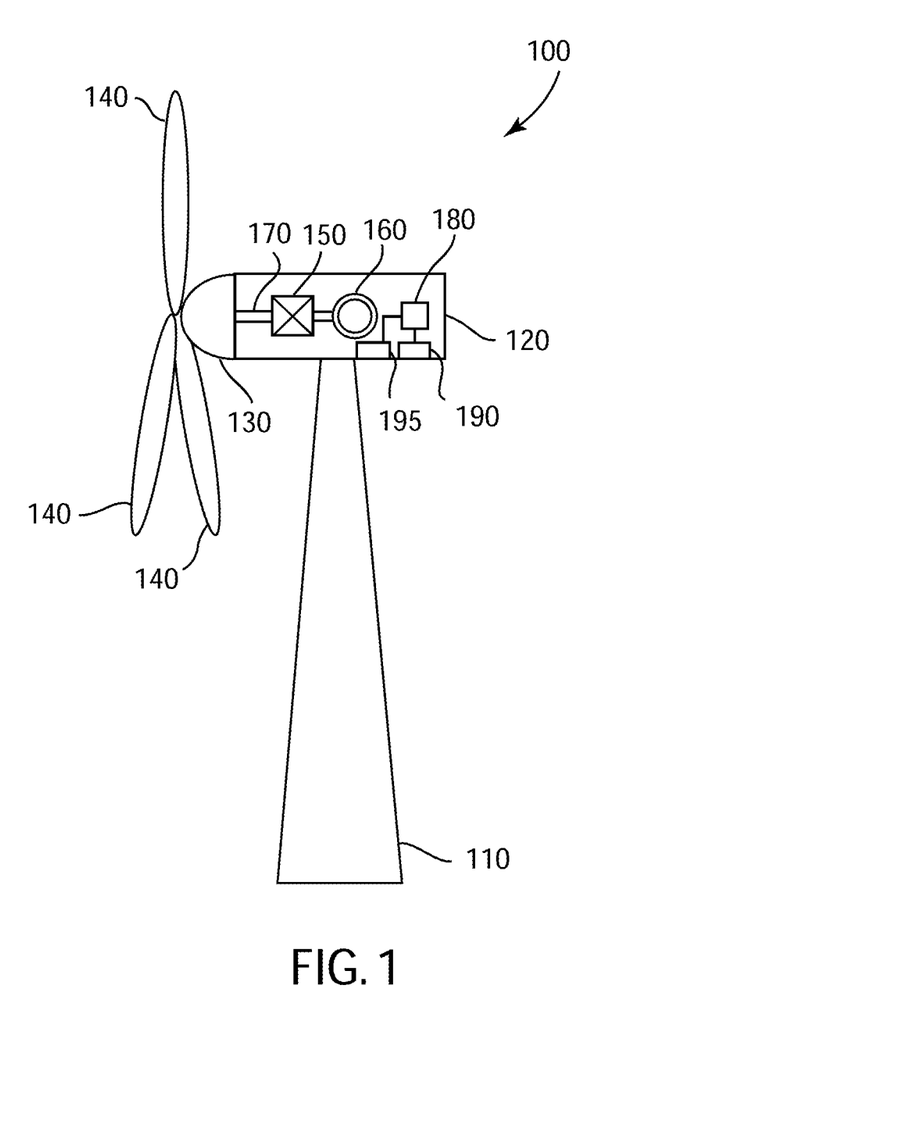
FIG. 1 is a schematic illustrating the environment in which an embodiment of the present invention operates.

Referring now to the FIGURES, where the various numbers represent like elements throughout the several views, FIG. 1 is a schematic illustrating the environment in which an embodiment of the present invention operates. Therein, a turbine 100 may include a tower 110 on which a nacelle 120 may be mounted. At a lateral end of the nacelle 120, a hub 130 may be mounted which supports a plurality of blades 140. As illustrated, disposed within the nacelle 120 are a gear box 150 and a generator 160. Some configurations of the turbine 100 may not incorporate the gear box 150. The application of the present invention is not limited to a turbine 100 that incorporates the gear box 150. Embodiments of the present invention may also be applied to a turbine 100 that may not include the gear box 150.

The gear box 150 and the generator 160 are connected to the hub 130 via a drive train 170. Furthermore, an asymmetric icing detection system 180 (hereinafter "system 180") may also be disposed within the nacelle 120. Components communicating with the system 180 may include, but is not limited to: a vibration sensor 190, a rotorspeed sensor 195, and a rotor position sensor (not illustrated in FIG. 1). The vibration sensor 190 measures the tower vibration. One advantage of the present invention is that the sensors 190, 195 are typically normal components of a turbine 100. Therefore, a user is not required to purchase, install, and maintain additional new sensors.

An embodiment of the system 180 may receive rotorspeed data from the rotorspeed sensor 195 to determine whether at least one blade (of the plurality) 140 may be experiencing icing. If the rotorspeed sensor 195 is not available, the present invention may configure the vibration sensor 190 for that purpose.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program. Any suitable computer readable medium may be utilized.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer, such as, but not limiting of: via a telephone line, via the Internet using an Internet Service Provider, or the like.

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory. These instructions can direct a computer or other programmable data processing apparatus to function in a particular manner. This is such that the instructions stored in the computer-readable memory produce an article of manufacture including instruction means, which implement the function/act, specified in the flowchart and/or block diagram block or blocks. The computer program instructions may also be loaded onto a computer or other programmable data processing apparatus. These instructions may cause a series of operational steps to be performed on the computer or other programmable apparatus to produce a computer implemented process. Here, the instructions, which execute on the computer or other programmable apparatus, provide steps for implementing the functions/acts specified in the flowchart and/or block diagram blocks.

An embodiment of the present invention takes the form of a software application and process that utilizes rotorspeed acceleration to detect asymmetric icing on a wind turbine. The present invention can be applied to many forms of wind turbines (hereinafter turbine) including those located in regions, which may not typically have atmospheric conditions that support icing.

The present invention may be configured to automatically and/or continuously monitor rotorspeed acceleration while the turbine operates, to determine whether asymmetric icing may be occurring. Alternatively, the present invention may be configured to require a user action to initiate operation.

Figure 2A:
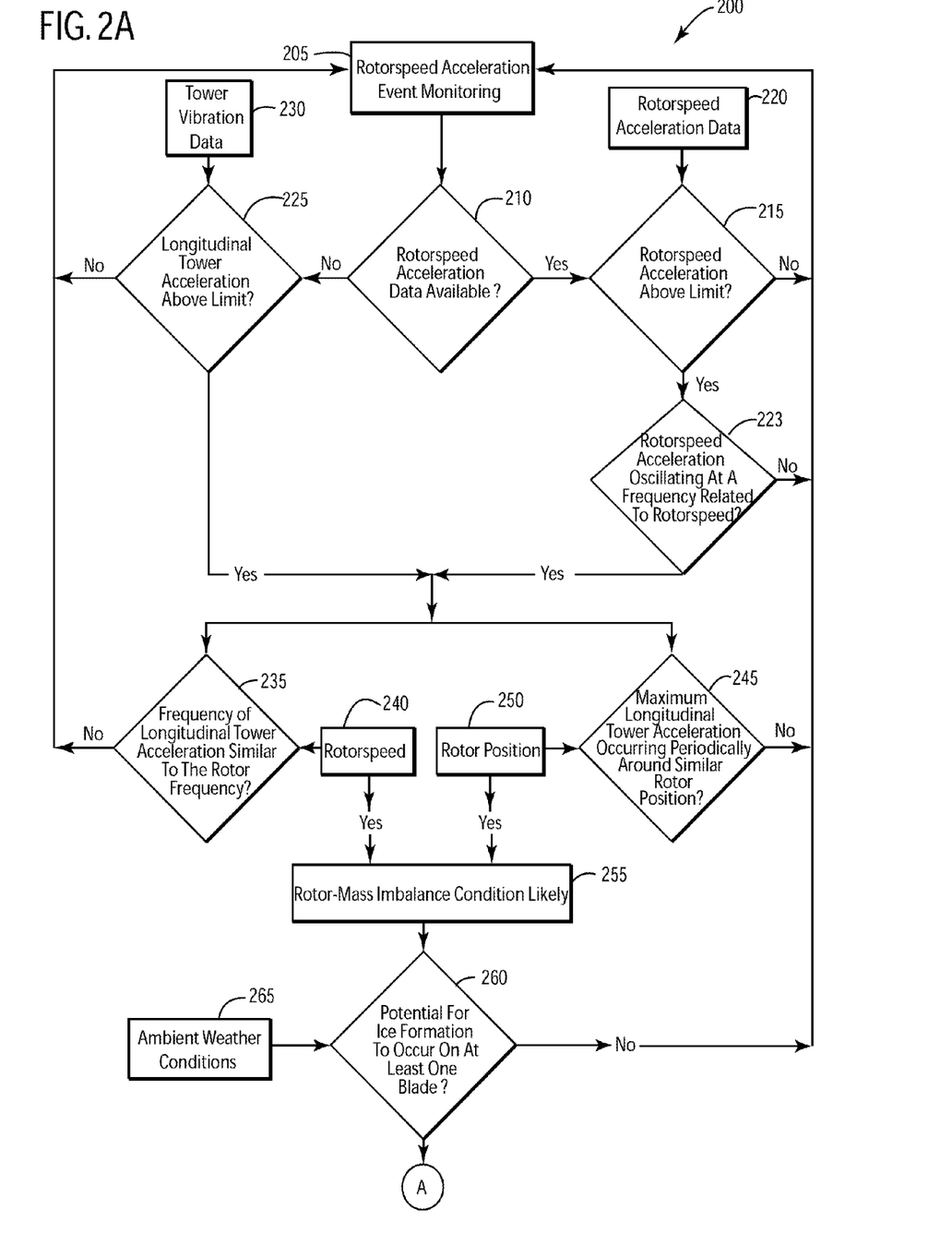
FIGS. 2A and 2B (collectively FIG. 2) are flowcharts illustrating an example of a method of detecting asymmetric icing in accordance with an embodiment of the present invention.
Figure 2B:
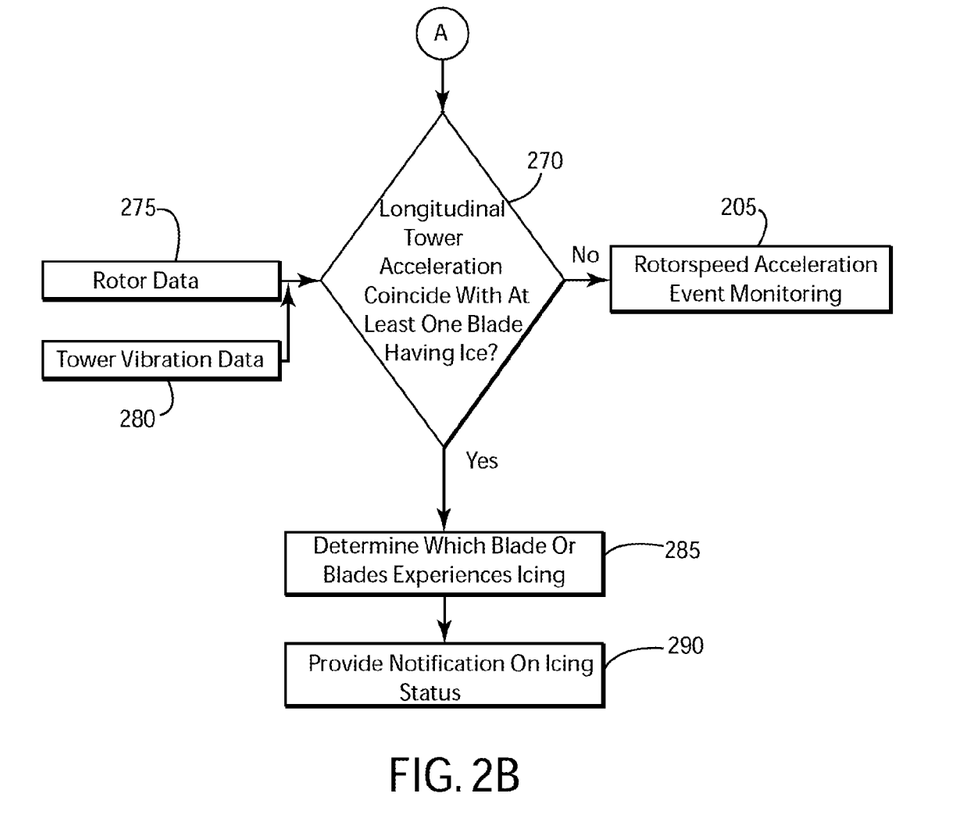

The present invention may function as a stand-alone system. Alternatively, the present invention may be integrated as a module, or the like, within a broader system, such as a turbine control or a plant control system. Referring now to FIGS. 2A and 2B (collectively FIG. 2), which are flowcharts illustrating a method 200 of detecting asymmetric icing, in accordance with an embodiment of the present invention. In step 205, the method 200 is enabled to monitoring the activity of a turbine 100. An embodiment of the method 200 may be configured to continuously operate to determine whether icing may be occurring on at least one blade 140.

In step 210, the method 200 may determine whether rotorspeed acceleration data is available. If the rotorspeed acceleration is available, then the method 200 may proceed to step 215; otherwise the method 200 may proceed to step 225.

In step 215, the method 200 may determine whether the rotorspeed acceleration is above a rotorspeed acceleration limit. Step 215 may compare the actual rotorspeed acceleration data to a preconfigured rotorspeed acceleration limit. The present invention may receive actual rotorspeed data from the rotorspeed sensor 195, discussed in reference to FIG. 1. Referring again to step 215, the preconfigured rotorspeed acceleration limit may be a user settable parameter. Alternatively, the preconfigured rotorspeed acceleration limit may be received by step 215 from another control system, such as a plant control system, or the like. As illustrated, the method 200 at step 215 may receive the rotorspeed acceleration data from step 220. If the rotorspeed acceleration does not exceed the limit, then the method 200 may revert to step 205, otherwise the method 200 may proceed to step 223.

In step 223, the method 200 may determine whether the rotorspeed acceleration is oscillating at a frequency related to the actual rotorspeed. Step 223 may determine the frequency of the rotorspeed acceleration. Next, that frequency may be compared to either the actual rotorspeed or rotor position. As discussed, the present invention may receive actual rotorspeed data from the rotorspeed sensor 195, or rotorposition data from a rotorposition sensor. If the rotorspeed acceleration is not is oscillating at a frequency related to either the actual rotorspeed or rotorposition, then the method 200 may revert to step 205, otherwise the method 200 may proceed to either step 235 or step 245.

In step 225, the method 200 may determine whether the longitudinal tower acceleration is above a longitudinal acceleration limit. Step 225 may incorporate the actual tower vibration data to calculate a longitudinal tower acceleration, which is then compared to a preconfigured longitudinal acceleration limit. Referring back FIG. 1, the present invention may receive actual tower vibration data from vibration sensor 190. Referring again to step 225, the preconfigured acceleration limit may be a user settable parameter. Alternatively, the preconfigured acceleration limit may be received by step 225 from another control system, such as a plant control system, or the like. As illustrated, step 225 may receive the tower vibration data from step 230. If the lateral tower acceleration does not exceed the limit, then the method 200 may revert to step 205, otherwise the method 200 may proceed to either step 235 or step 245.

The present invention may be utilized on a turbine 100 that has at least one sensor that can provide either rotorspeed data or rotor position data to the method 200. As illustrated, if the present invention is implemented on a turbine 100 having a sensor that provides rotorspeed, then the method 200 may precede from either step 215 or 225 to step 235. Otherwise if the present invention is implemented on a turbine 100 having a sensor that provides rotor position, then the method 200 may precede from either step 215 or 225 to step 245.

In step 235, the method 200 may determine whether the frequency of the longitudinal tower acceleration is similar to the rotor frequency. Step 235 may compare the frequency of longitudinal tower acceleration of block 225 to the actual rotor speed. Step 235 may receive the rotorspeed data from step 240. As discussed, the rotorspeed data may be received from a rotorspeed sensor 195 on the turbine 100. If the frequency of the longitudinal tower acceleration is similar to the actual rotorspeed, then the method 200 may proceed to step 255; otherwise the method 200 may revert to step 205.

In step 245, the method 200 may determine whether the maximum longitudinal tower acceleration occurs periodically around the same rotor position. Step 230 may first determine the value of maximum longitudinal tower acceleration. Next, step 245 may determine whether that value is repeatedly occurring at or near the same rotor position. As illustrated, step 245 may receive the rotor position data from step 250. The rotor position data may be received from a preexisting sensor on the turbine 100. If the maximum longitudinal tower acceleration is repeatedly occurring at or near the same rotor position, then the method 200 may proceed to step 255; otherwise the method 200 may revert to step 205.

In step 255, the method 200 has determined that a rotor-mass imbalance condition is likely. The method 200 may be configured to provide a notification that a rotor-mass imbalance condition is likely. The notification may be an alarm of varying forms such as, but not limited to, an audio signal, a graphic, a textual message, or any combination thereof.

In step 260, the method 200 may determine whether there is a potential for icing on at least one blade 140. Step 260 may utilize ambient weather condition data to determine whether icing could occur. For example, but not limited to, an embodiment of the present invention may utilize temperature, humidity, and air pressure in determining whether icing may occur. As illustrated, step 260 may receive the ambient weather condition data from step 265. A turbine 100 typically has hardware that provides data on the ambient weather conditions, and thus embodiments the present invention may not require additional hardware. If step 260 determines that the ambient weather conditions support icing, then the method 200 may proceed to step 270; otherwise the method 200 may revert to step 205.

In step 270, the method 200 may determine whether the actual longitudinal tower acceleration coincides with longitudinal tower accelerations due to at least one blade 140 having iced. As illustrated, step 270 may receive rotor data (such as rotor position or rotorspeed) from step 275, and tower vibration data from step 280. Next, step 270 may utilize the received data to calculate a range of longitudinal tower accelerations that may result from icing on at least one blade 140. The calculated longitudinal tower accelerations are then compared to either the actual rotorspeed acceleration determined in step 215, or the actual longitudinal tower acceleration determined in step 225, (whichever is available). Alternatively, an embodiment of the present invention may compare the actual longitudinal tower acceleration to a previously stored or estimated value. If the step 270 determines that either the actual rotorspeed acceleration or the longitudinal tower acceleration coincide with the calculated longitudinal tower accelerations, then the method 200 may proceed to step 285; otherwise the method 200 may revert to step 205. Alternatively, if step 270 determines that the actual longitudinal tower acceleration coincides with the estimated or stored longitudinal tower accelerations, then the method 200 may proceed to step 285; otherwise the method 200 may revert to step 205.

In steps 285, the method 200 may determine which blade or blades 140 may be experiencing icing. For example, but not limited to, the method 200 in step 285 may determine if icing occurs on a blade1, or a blade2, or a blade3, or any combinations thereof. Furthermore, in step 290, the method 200 may provide notification of which blade or blades 140 may be experiencing icing. Similar to step 255, the notification may be an alarm of varying forms such as, but not limited to, an audio signal, a graphic, or a text message. Furthermore, the method 200 may be configured to transmit the icing status to other control systems, such as the turbine control system, plant control system, or the like.

Figure 3:
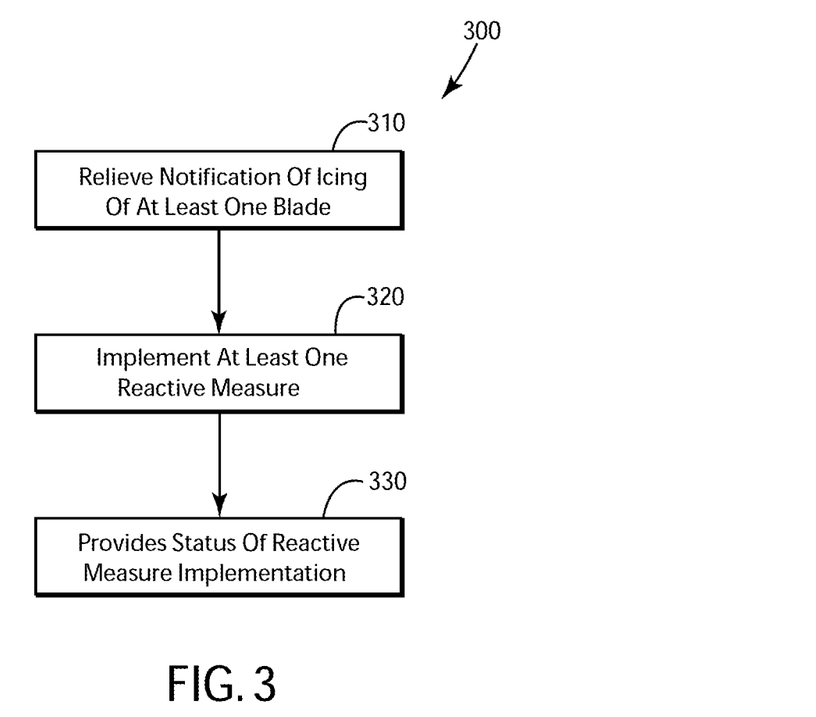
FIG. 3 is a flowchart illustrating an example of a method of responding to a detection of asymmetric icing in accordance with an embodiment of the present invention.

Referring now to FIG. 3, which is a flowchart illustrating an example of a method of responding to a detection of asymmetric icing in accordance with an embodiment of the present invention.

In block 310, the method 300, may receive a notification of icing of at least one blade 140 from the method 200. Here, the method 300 may take the form of a control system. The control system may include for example, but not limited to, a turbine control system, a plant control system, or the like. In an embodiment of the present invention, the notification may be received by the control system, for example, but not limited to, via a wired, wireless, or other forms of electronically transmitting the notification.

In block 320, the method 300, may implement at least one reactive measure to reduce or remove the icing. A reactive measure may include for example, but not limited to, reducing the rotor speed, lowering a power generation set point, braking procedures, or the like.

In block 330, the method 300, provides a status notification on the reactive measure (s) that was implemented. The notification may be an alarm of varying forms such as, but not limited to, an audio signal, a graphic, or a textual message, or any combination thereof.

Figure 4:
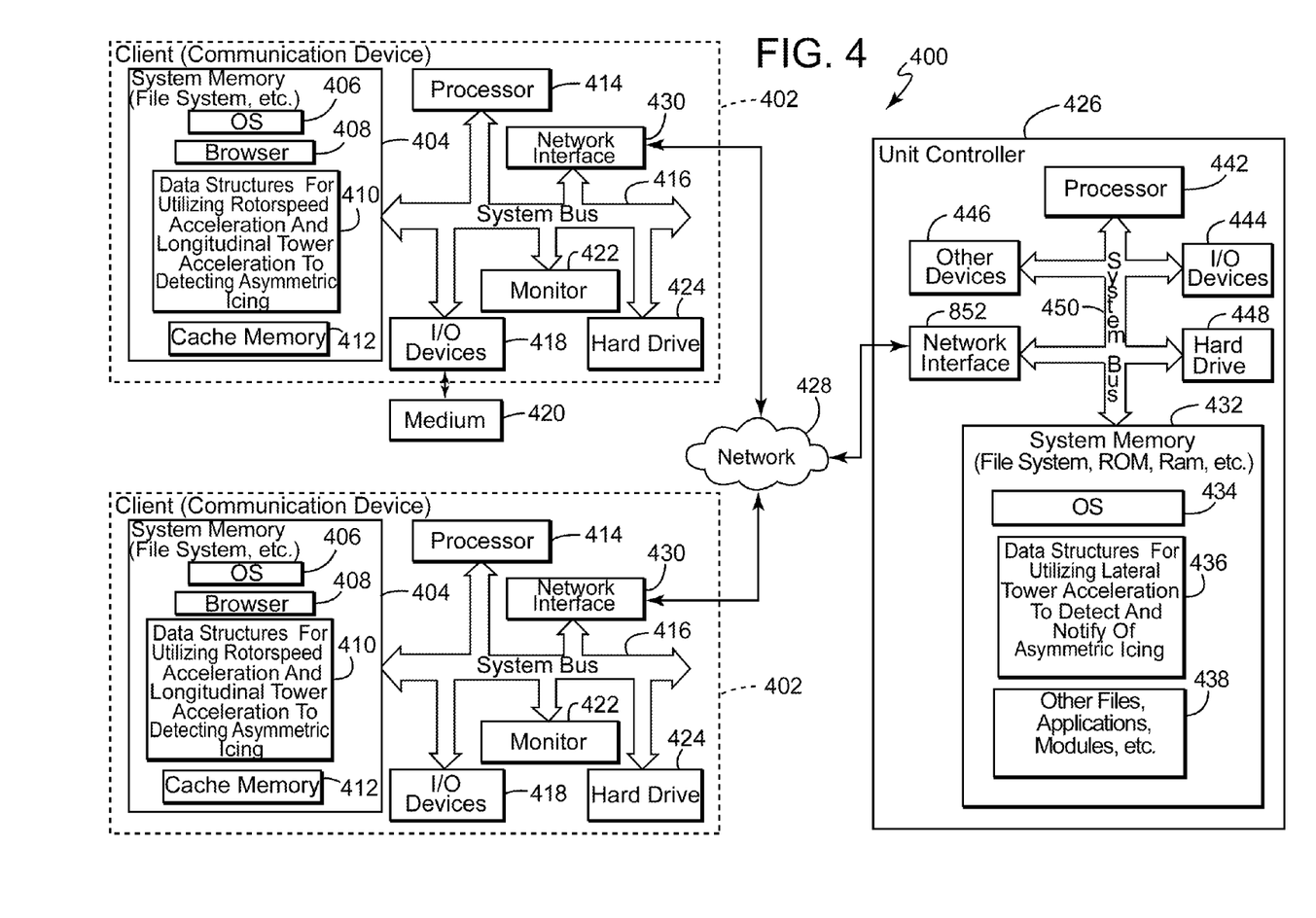
FIG. 4 is a block diagram of an exemplary system for detecting asymmetric icing in accordance with an embodiment of the present invention.

FIG. 4 is a step diagram of an exemplary system 200 to detect asymmetric icing in accordance with an embodiment of the present invention. The elements of the method 200 may be embodied in and performed by the system 400. The system 400 may include one or more user or client communication devices 402 or similar systems or devices (two are illustrated in FIG. 4). Each communication device 402 may be for example, but not limited to a computer system, a personal digital assistant, a cellular phone, or similar device capable of sending and receiving an electronic message.

The communication device 402 may include a system memory 404 or local file system. The system memory 404 may include for example, but not limited to, a read only memory (ROM) and a random access memory (RAM). The ROM may include a basic input/output system (BIOS). The BIOS may contain basic routines that help to transfer information between elements or components of the communication device 402. The system memory 404 may contain an operating system 406 to control overall operation of the communication device 402. The system memory 404 may also include a browser 408 or web browser. The system memory 404 may also include data structures 410 or computer-executable code to detect asymmetric icing that may be similar or include elements of the method 200 in FIGS. 2A and 2B.

The system memory 404 may further include a template cache memory 412, which may be used in conjunction with the method 200 in FIGS. 2A and 2B to automatically store data from the most recent asymmetric icing detection.

The communication device 402 may also include a processor or processing unit 414 to control operations of the other components of the communication device 402. The operating system 406, browser 408, data structures 410 may be operable on the processor 414. The processor 414 may be coupled to the memory system 404 and other components of the communication device 402 by a system bus 416.

The communication device 402 may also include multiple input devices, output devices or combination input/output devices 418. Each input/output device 418 may be coupled to the system bus 416 by an input/output interface (not shown in FIG. 4). The input and output devices or combination I/O devices 418 permit a user to operate and interface with the communication device 402 and to control operation of the browser 408 and data structures 410 to access, operate and control the software to automatically store data from the most recent asymmetric icing detection. The I/O devices 418 may include a keyboard and computer pointing device or the like to perform the operations discussed herein.

The I/O devices 418 may also include disk drives, optical, mechanical, magnetic, or infrared input/output devices, modems or the like. The I/O devices 418 may be used to access a medium 420. The medium 420 may contain, store, communicate or transport computer-readable or computer-executable instructions or other information for use by or in connection with a system, such as the communication devices 402.

The communication device 402 may also include or be connected to other devices, such as a display or monitor 422. The monitor 422 may be used to permit the user to interface with the communication device 402.

The communication device 402 may also include a hard disk drive 424. The hard drive 424 may be coupled to the system bus 416 by a hard drive interface (not shown in FIG. 4). The hard drive 424 may also form part of the local file system or system memory 404. Programs, software and data may be transferred and exchanged between the system memory 404 and the hard drive 424 for operation of the communication device 402.

The communication devices 402 may communicate with a remote server 426 and may access other servers or other communication devices similar to communication device 402 via a network 428. The system bus 416 may be coupled to the network 428 by a network interface 430. The network interface 430 may be a modem, Ethernet card, router, gateway or the like for coupling to the network 428. The coupling may be a wired connection or wireless. The network 428 may be the Internet, private network, an intranet or the like.

The server 426 may also include a system memory 432 that may include a file system, ROM, RAM, and the like. The system memory 432 may include an operating system 434 similar to operating system 406 in communication devices 402. The system memory 432 may also include data structures 436 to automatically store data from the most recent asymmetric icing detection. The data structures 436 may include operations similar to those described with respect to the method 200 for detecting asymmetric icing in accordance with an embodiment of the present invention. The server system memory 432 may also include other files 438, applications, modules, and the like.

The server 426 may also include a processor 442 or a processing unit to control operation of other devices in the server 426. The server 426 may also include I/O device 444. The I/O devices 444 may be similar to I/O devices 418 of communication devices 402. The server 426 may further include other devices 446, such as a monitor or the like to provide an interface along with the I/O devices 444 to the server 426. The server 426 may also include a hard disk drive 448. A system bus 450 may connect the different components of the server 426. A network interface 452 may couple the server 426 to the network 428 via the system bus 450.

The flowcharts and step diagrams in the Figures illustrate the architecture, functionality, and operation of possible implementations of systems, methods and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step might occur out of the order noted in the figures. For example, two steps shown in succession may, in fact, be executed substantially concurrently, or the steps may sometimes be executed in the reverse order, depending upon the functionality involved. It will also be noted that each step of the block diagrams and/or flowchart illustration, and combinations of steps in the block diagrams and/or flowchart illustration, can be implemented by special purpose hardware-based systems which perform the specified functions or acts, or combinations of special purpose hardware and computer instructions.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of detecting asymmetric icing on a wind turbine, the method comprising:
   providing a rotorspeed acceleration monitoring system;
   determining from the rotorspeed acceleration monitoring system whether a rotorspeed acceleration is above a rotorspeed acceleration limit;
   determining from the rotorspeed acceleration monitoring system whether the rotorspeed acceleration is oscillating at a frequency related to a rotorspeed;
   determining whether a rotor-mass imbalance condition exists;
   determining whether the rotor-mass imbalance coincides with icing on a rotor; and
   determining whether a longitudinal tower acceleration coincides with icing on the rotor.

2. The method of claim 1, wherein the step of determining whether the rotorspeed acceleration is above a rotorspeed acceleration limit comprises:
   determining whether rotor acceleration data is available; and
   if rotor acceleration data is available, then further comprising:
      receiving rotorspeed acceleration data; and
      determining whether a rotorspeed acceleration is above a rotorspeed acceleration limit; otherwise
   if rotor acceleration data is not available, then further comprising:
      receiving tower vibration data; and
      determining whether a longitudinal tower acceleration is above a longitudinal acceleration limit.

3. The method of claim 1, wherein determining whether a rotor-mass imbalance condition exists comprises determining whether a longitudinal tower acceleration frequency is approximately a rotor frequency.

4. The method of claim 3 further comprising the step of receiving a rotor speed.

5. The method of claim 1, wherein determining whether a rotor-mass imbalance condition exists comprises determining whether a maximum tower acceleration repeatedly occurs near the rotor location where the immediately previous maximum tower acceleration occurred.

6. The method of claim 5 further comprising the step of receiving data on a rotor position.

7. The method of claim 1, wherein the rotor comprises a plurality of blades, the method further comprising determining whether at least one blade of the plurality of blades has a potential for icing.

8. The method of claim 7, wherein the step of determining whether at least one blade of the plurality of blades has a potential for icing further comprises the step of receiving at least one ambient weather condition.

9. The method of claim 1, wherein the step of determining whether the longitudinal tower acceleration coincides with icing on a rotor comprises receiving data on a rotor position.

10. The method of claim 1 further comprising:
   determining which blade of the plurality of blades is experiencing icing; and
   providing notification on which blade of the plurality of blades is experiencing icing.

\* \* \* \* \*

UNITED STATES PATENT AND TRADEMARK OFFICE
CERTIFICATE OF CORRECTION

PATENT NO. : 8,662,842 B2  Page 1 of 1
APPLICATION NO. : 12/824516
DATED : March 4, 2014
INVENTOR(S) : Hubert Oing et al.

It is certified that error appears in the above-identified patent and that said Letters Patent is hereby corrected as shown below:

In the Drawings:

In Fig. 3, Sheet 4 of 5, for Tag "310", in Line 1, delete "Relieve" and insert -- Receive --, therefor.

In Fig. 4, Sheet 5 of 5, delete Tag "852" and insert Tag -- 452 --, therefor.

Signed and Sealed this
Twenty-seventh Day of May, 2014

Michelle K. Lee
*Deputy Director of the United States Patent and Trademark Office*